US006983189B2

(12) United States Patent
Lu (10) Patent No.: US 6,983,189 B2
(45) Date of Patent: Jan. 3, 2006

(54) SYSTEMS AND METHODS FOR MANUFACTURING A PRODUCT IN A PULL AND PUSH MANUFACTURING SYSTEM AND ASSOCIATED METHODS AND COMPUTER PROGRAM PRODUCTS FOR MODELING THE SAME

(75) Inventor: Roberto F. Lu, Bellevue, WA (US)

(73) Assignee: The Boeing Company, Seattle, WA (US)

( * ) Notice: Subject to any disclaimer, the term of this patent is extended or adjusted under 35 U.S.C. 154(b) by 143 days.

(21) Appl. No.: 10/172,709

(22) Filed: Jun. 14, 2002

(65) Prior Publication Data

US 2003/0233159 A1    Dec. 18, 2003

(51) Int. Cl.
 *G06F 19/00*    (2006.01)
(52) U.S. Cl. .................. 700/102; 700/100; 700/101
(58) Field of Classification Search .......... 700/99–102, 700/105–107, 11, 23
See application file for complete search history.

(56) References Cited

U.S. PATENT DOCUMENTS

| | | | | | |
|---|---|---|---|---|---|
| 4,866,628 | A | * | 9/1989 | Natarajan ................... | 700/102 |
| 5,093,794 | A | * | 3/1992 | Howie et al. ............... | 700/100 |
| 5,099,431 | A | * | 3/1992 | Natarajan ................... | 700/105 |
| 5,148,370 | A | * | 9/1992 | Litt et al. .................... | 700/104 |
| 5,233,533 | A | * | 8/1993 | Edstrom et al. ............ | 700/103 |
| 5,303,144 | A | * | 4/1994 | Kawashima et al. ........... | 705/8 |
| 5,402,350 | A | * | 3/1995 | Kline ........................ | 700/101 |
| 5,444,632 | A | * | 8/1995 | Kline et al. ................. | 700/100 |
| 5,493,501 | A | * | 2/1996 | Kondo ........................ | 700/95 |
| 5,594,639 | A | * | 1/1997 | Atsumi ....................... | 700/107 |
| 5,841,660 | A | * | 11/1998 | Robinson et al. ........... | 700/115 |
| 5,993,041 | A | * | 11/1999 | Toba .......................... | 700/99 |
| 6,167,380 | A | * | 12/2000 | Kennedy et al. .............. | 705/10 |
| 6,584,369 | B2 | * | 6/2003 | Patel et al. ................. | 700/100 |
| 6,615,097 | B2 | * | 9/2003 | Ozaki ......................... | 700/121 |

OTHER PUBLICATIONS

Ashok Kumar, Jaideep Motwani; *A Methodology for Assessing Time-Based Competitive Advantage of Manufacturing Firms*; International Journal of Operations & Production Management; 1995; pp. 36-53; vol. 15, No. 2; MCS University Press 0144-3577.

Ilhyung Kim, Christopher S. Tang; *Lead Time and Response Time in a Pull Production Control System*; 1997; pp. 474-485; European Journal of Operational Research 101; Elsevier Science B.V.

(Continued)

*Primary Examiner*—John Follansbee
*Assistant Examiner*—Aaron C. Perez-Daple
(74) *Attorney, Agent, or Firm*—Alston & Bird LLP (57) ABSTRACT

A system of manufacturing a product in a pull and push manufacturing system is provided, where the product comprises at least one model and each model includes at least one component. The system includes an order scheduler, a component scheduler, a make-to-order (MTO) portion and an assemble to order (ATO) portion. The order scheduler is capable of receiving order(s) for model(s) of the product, and the component scheduler is capable of generating a component firing order schedule (CFOS) for the components corresponding to the models ordered. The MTO portion can release each component and thereafter produce the components. And the ATO portion can release each order and thereafter assemble the orders released from the produced components at a number of assembly lines. Advantageously, a number of system parameters can be determined based upon modeling the manufacturing system.

30 Claims, 3 Drawing Sheets

OTHER PUBLICATIONS

Uday S. Rao, Peter L. Jackson; *Estimating Performance Measures in Repetitive Manufacturing Environments Via Stochastic Cyclic Scheduling*; IIE Transactions; 1996; pp. 929-939.

Enver Yucesan, Xavier De Groote; *Lead Times, Order Release Mechanisms, and Customer Service*; European Journal of Operational Research 120; 2000; pp. 118-130; Elsevier Science B.V.

M.C. Bonney, Zongmao Zhang, M.A. Head, C.C. Tien, R.J. Barson; *Are Push and Pull Systems Really So Different?*; Int. J. Production Economics 59; 1999; pp. 53-64; Elsevier Science B.V.

John H. Allen; *Make Lean Manufacturing Work for You*; Jun. 2000; pp. 54-58,60,62,64.

Robert R. Inman; *Are you Implementing a Pull System by Putting the Cart Before the Horse*; Production and Inventory Management Journal; 1999 (Second Quarter); pp. 67-71; APICS.

James A.G. Krupp; *Some Thoughts on Implementing "Pull" Systems*; Production and Inventory Management Journal; 1999 (Fourth Quarter); pp. 35-39; APICS.

Jan Olhager, Bjorn Ostlund; *An Integrated Push—Pull Manufacturing Strategy*; European Journal of Operational Research 45; 1990; pp. 135-142; Elsevier Science Publishers B.V.

* cited by examiner

SYSTEMS AND METHODS FOR MANUFACTURING A PRODUCT IN A PULL AND PUSH MANUFACTURING SYSTEM AND ASSOCIATED METHODS AND COMPUTER PROGRAM PRODUCTS FOR MODELING THE SAME

FIELD OF THE INVENTION

The present invention relates to systems and methods of manufacturing a product and, more particularly, to systems and methods for manufacturing a product in a manufacturing system integrating pull, push, make-to-order and assemble-to-order processes.

BACKGROUND OF THE INVENTION

In many industries that produce products on a large scale, manufacturing systems include pull and push processes, typically within individual make-to-order and assemble-to-order systems. Typically, within large scale manufacturing systems, orders for products are pushed to an assemble-to-order system, which assembles the products from the components that make up the products. Prior to assembling the product, however, the components must be manufactured, such as in a make-to-order system, either by the manufacturer of the product and/or one or more third party suppliers of various components of the product. In an ideal setting, then, the components of the products are manufactured "just-in-time" to be pulled into an assembly facility where the components are assembled together to form the product in response to receipt of an order for the product. In reality, however, many factors within the manufacturing that disrupt the manufacture of the components and/or the assembly of the products and, therefore, create inefficiencies in the overall manufacturing systems.

Because of the factors that create inefficiencies in large scale manufacturing systems, many manufacturers research and develop contemplated manufacturing systems prior to implementing the systems. In this regard, contemplated manufacturing systems are modeled and operated under simulated conditions to measure the efficiency of the system. By measuring the efficiency of the system, then, manufacturers can adjust system parameters in an attempt to improve the efficiency of the system. In many conventional modeling techniques, just as in many conventional manufacturing systems, one or more orders are generated in a particular sequence and, from those order(s), an assembly schedule is produced. And from the assembly schedule, a production schedule for producing the components is generated, typically in the same sequence as the assembly schedule. In modeling systems, then, the operation of the contemplated manufacturing system is simulated from the assembly schedule and the production schedule to determine how efficiently the manufacturing system can assemble the final product from assembled components.

In increasing the efficiency of manufacturing systems, many modeling techniques and conventional manufacturing systems developed from such modeling techniques are based upon the most efficient process of producing individual components and products assembled from the components, independent of one another. In this regard, on a component level, many conventional manufacturing systems and modeling techniques seek to produce as many components as possible at the same time. And on a product level, many conventional manufacturing systems and modeling techniques seek to find the most efficient method by which a product can be assembled at a particular location designated for the assembly of that product.

Whereas many manufacturing systems and techniques for modeling manufacturing systems are adequate, such systems and techniques also have drawbacks, many of which stem from a lack of interaction between the assembly of products and the production of the components that are thereafter assembled into the products. In this regard, in generating a production schedule for components in the same sequence as the assembly schedule for components, conventional manufacturing systems and modeling techniques ignore the fact that not all components of products have the same production, or manufacturing time. For example, in the aircraft industry, not all components across the different models of aircraft have the same lead time requirement. One or more components from subsequent orders may require longer production times than an original order. As such, inefficiencies result in scheduling the production of components from the original order prior to scheduling the production of components from subsequent orders, where the components from the subsequent orders require longer production times.

Also, as many typical modeling techniques seek to increase the efficiency of a manufacturing system by producing as many of a given component as possible at the same time, assembly requirements are ignored. In this regard, by producing as many of component "x" as possible, such modeling techniques discount the fact that orders for products requiring component "x" might not require the largest number of component "x" be produced at the same time. Further, on a product level, as many conventional modeling techniques base the efficiency of assembling products on assembling the products at a particular location, or assembly facility, designated for the assembly of that product, such modeling techniques inefficiently utilize the assembly facilities. For example, similar processes can often be performed for different products at a single location by a single assembly team.

SUMMARY OF THE INVENTION

In light of the foregoing background, the present invention provides an improved system and method of manufacturing a product in a pull and push manufacturing system, and an associated method and computer program product for modeling the same. In this regard, the product comprises at least one model that includes at least one component. According to embodiments of the present invention, a production schedule for producing the components is based upon the different manufacturing times of the components, as well as an order schedule for the models of the product. As such, the present invention accounts for the fact that one or more components from subsequent orders may require longer production times than an original order. Also, according to embodiments of the present invention, efficiency of the system is improved by the fact that the efficiency of producing the components is not solely based upon producing as many of a given component as possible at the same time. In this regard, according to the present invention, the efficiency of producing components is based upon producing each component as quickly as possible as an order for a model of the product including the respective component is received by the system, or released to assembly.

According to one aspect of the present invention, a system of manufacturing a product in a pull and push manufacturing system is provided, where the product comprises at least one model and each model includes at least one component. The system includes an order scheduler, a component scheduler, a make-to-order (MTO) portion and an assemble to order (ATO) portion. The order scheduler is capable of receiving at least one order for at least one model of the product, where each model has an associated assembly time. Also, the orders received are in a predefined sequence and each order includes a defined release time.

The component scheduler is capable of generating a component firing order schedule (CFOS) for a number of components corresponding to the models ordered based upon the defined release times of the respective orders and manufacturing times associated with the components. In this regard, the components in the CFOS are in a predetermined sequence and each component has a defined release time. The MTO portion is capable of releasing each component in the CFOS at a respective release time and thereafter producing the components released at a number of production centers. And with the produced components, the ATO portion is capable of releasing each order at a respective release time and thereafter assembling the orders released from the produced components at a number of assembly lines.

Advantageously, the assembly times of the models ordered, the manufacturing times of the components of the models ordered, the number of production centers and/or the number of assembly lines can be determined based upon modeling the manufacturing system. In this regard, the system can also include a processing element capable of modeling the system before the component scheduler generates the CFOS. The processing element is capable of modeling the system by simulating operation of the system with a set assembly time for each of the models of the product, a set manufacturing time for each of the components of the models, a set number of production centers and a set number of assembly lines. The processing element simulates operation of the system for a number of models of the product ordered over a defined time period and, based upon the simulation, the processing element can determine when a subsequent component and/or a subsequent order is buffered. Then, based upon the subsequent component and/or subsequent order being buffered, the processing element can adjust the set assembly time for at least one of the models of the product, the set manufacturing time for at least one of the components of the models, the set number of production centers and/or the set number of assembly lines.

The processing element can measure an efficiency of the system based upon a number of subsequent components buffered and/or a number of subsequent orders buffered. In this regard, the processing element can adjust the set assembly time for at least one of the models of the product, the set manufacturing time for at least one of the components of the models, the set number of production centers, and/or the set number of assembly lines based upon the measured efficiency. For example, the processing element can model the system by setting the number of production centers and the manufacturing time associated with each component before simulating operation of the system. Then, the processing element can measure the efficiency by comparing the number of subsequent orders buffered to a threshold such that, when the number of subsequent components buffered is greater than the threshold, the processing element can increase the number of production centers and/or decrease the manufacturing times of the respective components.

Also for example, the processing element can model the system by setting the number of assembly lines and the assembly time associated with each model of the product. The processing element can then measure the efficiency by comparing the number of subsequent orders buffered to a threshold such that, when the number of subsequent orders buffered is greater than the threshold, the processing element can increase the number of assembly lines and/or decrease the assembly times of the respective models ordered.

Additionally, or alternatively, the processing element can be capable of further modeling the system by measuring the efficiency of the system based upon an amount of time subsequent components are buffered and/or an amount of time subsequent orders are buffered. In such an embodiment, the processing element can adjust the set assembly time for at least one of the models of the product, the set manufacturing time for at least one of the components of the models, the set number of production centers, and/or the set number of assembly lines based upon the measured efficiency. For example, the processing element can set the number of production centers and the manufacturing time associated with each component before simulating operation of the system. Then, the processing element is capable of measuring an efficiency by comparing an amount of time subsequent orders are buffered to a threshold such that, when subsequent components are buffered for longer than the threshold, the processing element can increase the number of production centers and/or decrease the manufacturing times of the respective components.

In another example, the processing element can set the number of assembly lines and the assembly time associated with each model of the product. In this regard, the processing element is capable of measuring an efficiency by comparing an amount of time subsequent orders are buffered to a threshold. And when subsequent orders are buffered for longer than the threshold, the processing element can increase the number of assembly lines, decrease the assembly times of the respective models ordered, increase the number of production centers and/or decrease the manufacturing times of the respective components.

BRIEF DESCRIPTION OF THE DRAWINGS

Having thus described the invention in general terms, reference will now be made to the accompanying drawings, which are not necessarily drawn to scale, and wherein:

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
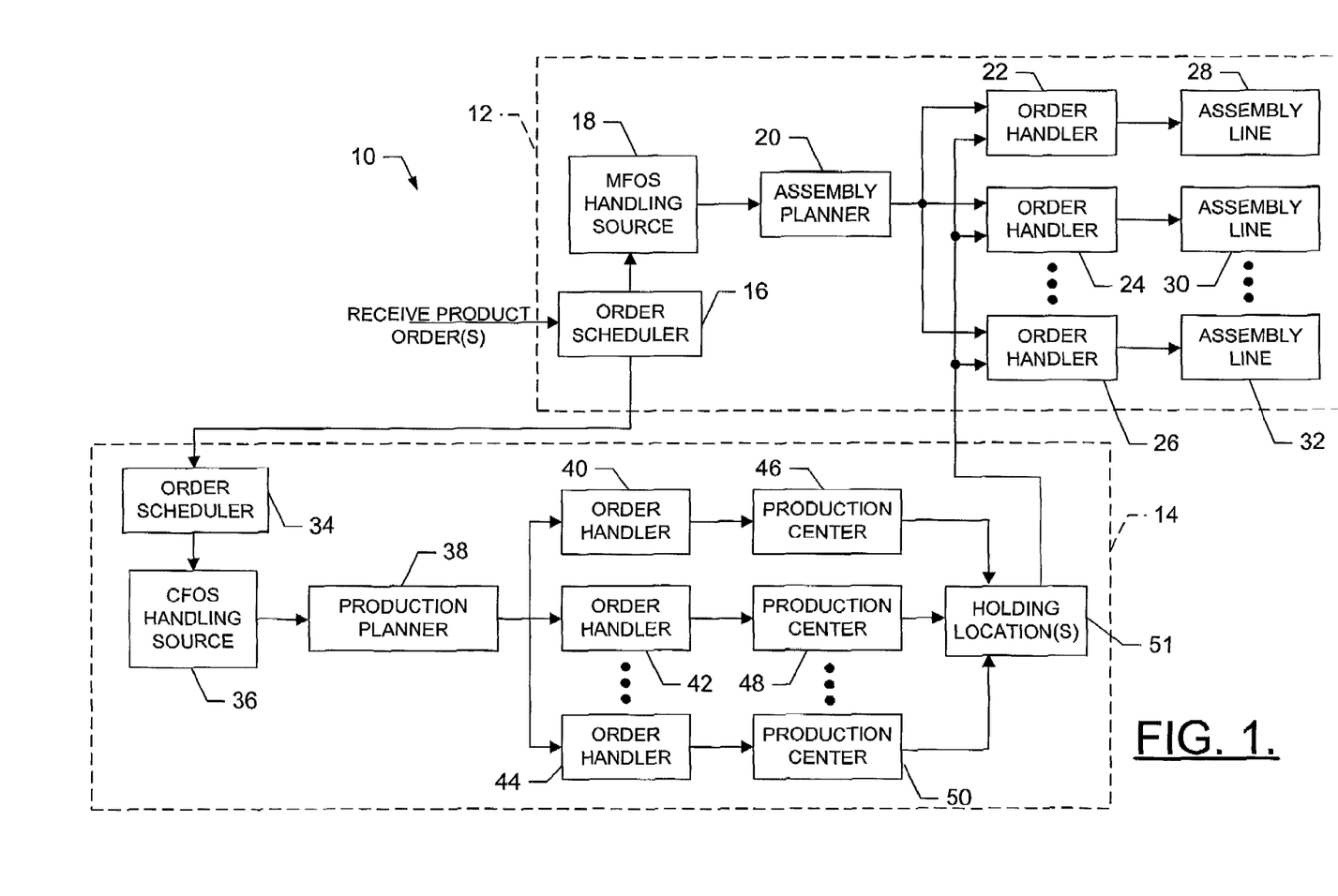
FIG. 1 is a block diagram of a pull and push manufacturing system according to one embodiment of the present invention.

Referring to FIG. 1, a system 10 for manufacturing a product that comprises at least one model including at least one component is provided. The system includes an assemble-to-order (ATO) portion 12 and a make-to-order (MTO) portion 14. According to the system, the ATO portion receives orders for the product, such as into an order scheduler 16. The order scheduler can comprise any of a number of different entities including, for example, a sales department, a marketing department, a scheduling department or any combination thereof. The orders can be received in an automated fashion and, as such, the order scheduler can additionally or alternatively comprise a processing element, such as a personal computer, operating a computer software program.

The product order scheduler 16 generates a master firing order schedule (MFOS) for the received product orders, which is described below in conjunction with modeling and simulating operation of the system. In this regard, the MFOS represents the sole schedule for the assemble to order (ATO) portion 12 of the manufacturing system 10. Typically, the MFOS includes orders for models of the product in a sequential order and designates when the orders are to be pushed to assembly. Based upon the MFOS, then, an MFOS handling source 18 releases orders to assembly at respective times included in the MFOS. An assembly planner 20 receives the released orders and thereafter distributes the orders to one or more individual order handlers (three of which are shown and designated 22, 24 and 26).

The order handlers 22, 24 and 26 process orders based upon the model of the product ordered. In this regard, each order handler is generally adapted to process orders for one or more of the models of the product, with some order handlers only adapted to process the orders of a single model and other order handlers adapted to process the orders for multiple models. Whereas the order handlers can comprise any of a number of entities, the order handlers typically comprise one or more planning departments, including any planning personal and associated computerized elements. Generally, once the order handlers receive orders, the order handlers pull all of the components of the respective models of the product ordered from the MTO 14 portion of the system 10. Thereafter, the order handlers issue respective orders to one or more assembly lines (three of which are shown and designated 28, 30 and 32), where the products are assembled from the respective components, with each model being associated with a defined assembly time. Although not necessary, the number of order handlers typically equals the number of assembly lines.

Like the order handlers 22, 24, 26, each assembly line 28, 30, 32 is generally adapted to assemble products for one or more of the models of the product, with some assembly lines only adapted to assemble orders for a single model of the product and other assembly lines adapted to assemble orders for multiple models of the product. Further, whereas each assembly line can comprise a separate entity, more than one assembly line can be grouped together in a larger entity, such as an assembly location or bay.

It will be appreciated that in some instances one or more assembly lines 28, 30, 32 adapted to assemble models of the type ordered cannot receive an order from an respective order handler. For example, an assembly line typically cannot receive an order when the assembly line is occupied assembling a product previously ordered, or when the assembly line is inoperable for any reason. In such instances, an order at respective order handlers 22, 24, 26 must be buffered or backlogged until the assembly line(s) can accept the order. When the respective order handler is buffering or backlogging an order waiting to be issued to the assembly line, the respective order handler cannot accept subsequent orders from the assembly planner 20. In addition, an order handler typically cannot accept a subsequent order from the assembly planner when the order handler is occupied pulling the components for a current order before the respective assembly line receives the order. In this regard, in instances where no order handlers adapted to process orders of the model ordered can accept an order from the assembly planner, the assembly planner can buffer or backlog subsequent orders received from the MFOS handling source 18 until such time that the order handlers can accept the subsequent orders. As stated, the components of the respective models of the product ordered are pulled from the MTO portion 14 of the system 10. It will be appreciated, then, that in order to most efficiently operate the system, the production of the components of the models ordered in the MTO portion is preferably based upon the release time of the orders in the MFOS. Thus, turning now to the MTO portion of the system, the MTO portion includes a component order scheduler 34 that generates a component firing order schedule (CFOS) based upon the MFOS and manufacturing times of the components. Like the order scheduler 16, the component orders can be received in an automated fashion and, as such, the component order scheduler can comprise a processing element, such as a personal computer, operating a computer software program. Like the MFOS, the method of generating the CFOS is more fully described below in conjunction with modeling and simulating operation of the system. Like the MFOS, the CFOS represents the sole schedule for the MTO portion of the system. Also like the MFOS, the CFOS includes orders for components of the models of the product, however, the order of the components in the CFOS is based upon the order of the respective product in the MFOS and the production time required of the components.

It will be appreciated that, although the product order scheduler 16 and the component order scheduler 34 are shown and described as separate elements within respective portions 12, 14 of the system 10, the product order scheduler and/or the component order scheduler can exist outside of the respective portion. Additionally, or alternatively, both the product order scheduler and the component order scheduler can be embodied in one scheduler adapted to perform the functions of both, where the single scheduler is located within one of the portions or outside of both portions.

Based upon the CFOS, a CFOS handling source 36 releases component orders to production at respective times included in the CFOS. A production planner 38 receives the released component orders and thereafter distributes the orders to one or more individual order handlers (three of which are shown and designated 40, 42 and 44). Whereas the illustrated embodiment includes multiple order handlers, it will be appreciated that the functions of multiple order handlers can be performed by a single order handler or performed by the CFOS handling source without departing from the spirit and scope of the present invention.

The order handlers 40, 42, 44 process orders and coordinate final production of the components listed on the CFOS based upon the particular component. Generally, once the order handlers receive component orders, the order handlers issue respective orders to one or more production centers (three of which are shown and designated 46, 48 and 50), where each component is associated with a defined manufacturing time associated with each component. In this regard, the production centers typically comprise a production facility or supplier of produced components. The number of production centers is typically based upon the number of components making up the models in the system, with one or more production centers capable of producing each component. And although not necessary, the number of order handlers typically equals the number of production centers.

From the production centers 46, 48, 50, the components are passed to one or more holding locations or buffers 51, where the components are pulled by the order handlers 22, 24 and 26 of the ATO portion 12 of the system 10 for assembly into the ordered models. It will be appreciated that in some instances one or more production centers cannot receive a component order from a respective order handler 40, 42, 44. For example, a production center typically cannot receive a component order when the production center is occupied producing a component previously ordered, or when the production center is inoperable for any reason. In such instances, a component order at the respective order handler(s) must be buffered or backlogged until the production center(s) can accept the order. In this regard, similar to the situation in the ATO portion of the system, when one or more order handlers 40, 42, 44 are buffering or backlogging orders waiting to be issued to respective assembly lines, the respective order handlers cannot accept subsequent orders from the production planner 38. As such, in instances where one or more order handlers cannot accept orders from the production planner, the production planner can buffer or backlog orders received from the CFOS handling source 36 until such time that the respective order handler(s) can accept a subsequent order.

It will be appreciated that the manufacturing system 10 will assemble models of the product and produce the components of the models with a measure of efficiency. In this regard, the efficiency of the system can be measured according to any of a number of system parameters, such as an amount of time a product order or component order must be buffered within the system, or a number of the product orders or component orders that must be buffered within the system. In this regard, system parameters such as the manufacturing times of the components of the models ordered, the number of production centers and the number of assembly lines are selected so as to facilitate the system operating with an optimum efficiency. In this regard, the present invention provides a method of modeling the system and simulating operation of the system to thereby select the system parameters by which to operate the system. The system can be modeled in any one of a number of different manners but, according to one embodiment, the system is modeled in a processing element such as a personal computer, running a computer program, such as the Quest software package distributed by the Delmia Corporation of Troy, Mich.

Modeling the manufacturing system 10 typically begins by generating the MFOS and the CFOS but, before operation of the manufacturing system can be modeled, the product must be defined. In this regard, the product can be defined to include M models, where each model is defined as $A_m$, m=1, 2, . . . M. Each model, then, requires an associated assembly time. For example, presuming a manufacturing system including four models (i.e., M=4), the assembly time could be represented as follows (where each time is represented in seconds): $A_1$=172,800; $A_2$=403,200; $A_3$= 576,000; and $A_4$=748,800.

To further define the models of the product, each model represents an assembly of J components, where each component of each model is defined as $C_{m,j}$, j= 1, 2, . . . J. Like each model, each component requires an associated manufacturing time $CM_{m,j}$. For example, presume manufacturing system 10 for a product that includes four models (i.e., M=4), where each model includes three components (J= 3). In such a system, the manufacturing times for the components could comprise the following (where the manufacturing times are in seconds):

|  | $CM_{1,j}$ | $CM_{2,j}$ | $CM_{3,j}$ | $CM_{4,j}$ |
|---|---|---|---|---|
| $C_{m,1}$ | 187,200 | 266,400 | 352,800 | 410,400 |
| $C_{m,2}$ | 374,400 | 482,400 | 583,200 | 748,800 |
| $C_{m,3}$ | 655,200 | 932,400 | 1,234,800 | 1,303,200 |

In addition to defining the product based upon a number of models and a number of components per model, the number of assembly lines 28, 30, 32 in the ATO portion of the system and the number of production centers 46, 48, 50 in the MTO portion of the system must be set or otherwise defined. Whereas the number of assembly lines can be set in any one of a number of manners, the number of assembly lines are typically set based upon a specified order distribution, described below. In this regard, the system can account for models ordered in greater numbers by providing more assembly lines, and models ordered in smaller numbers by providing fewer assembly lines. For example, presume four models of a product are ordered based upon the following distribution: $A_1$=50%, $A_2$=30%, $A_3$=12% and $A_4$=8%. The number of assembly lines, then, could be set such that three assembly lines are allocated for model $A_1$, two assembly lines are allocated for each of models $A_2$ and $A_3$, and one assembly line is allocated for model $A_4$, for a total of eight assembly lines.

Figure 2A:
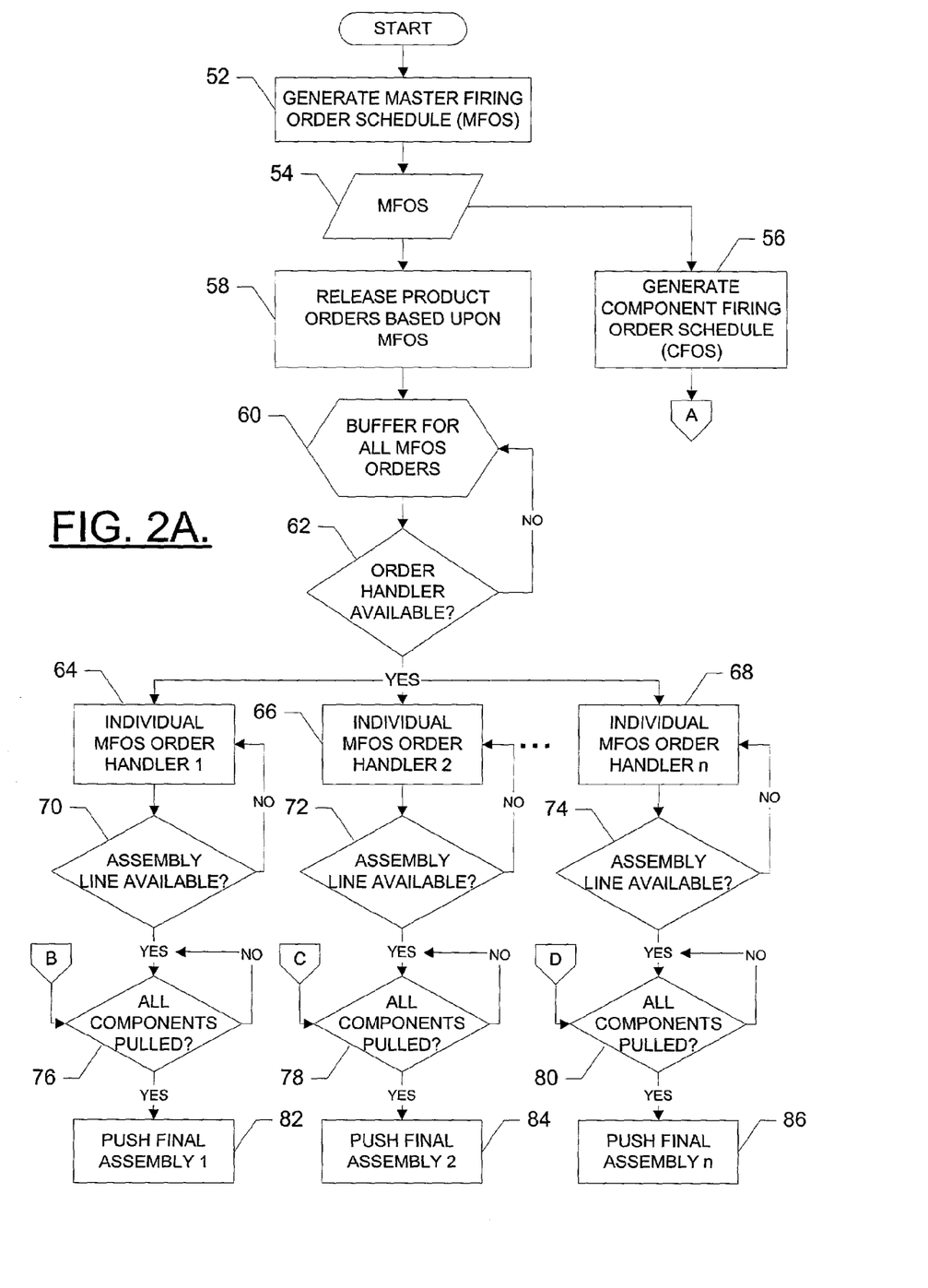
FIGS. 2A and 2B are flow charts illustrating various steps in a method of manufacturing a component in a pull and push manufacturing system according to one embodiment of the present invention.
Figure 2B:
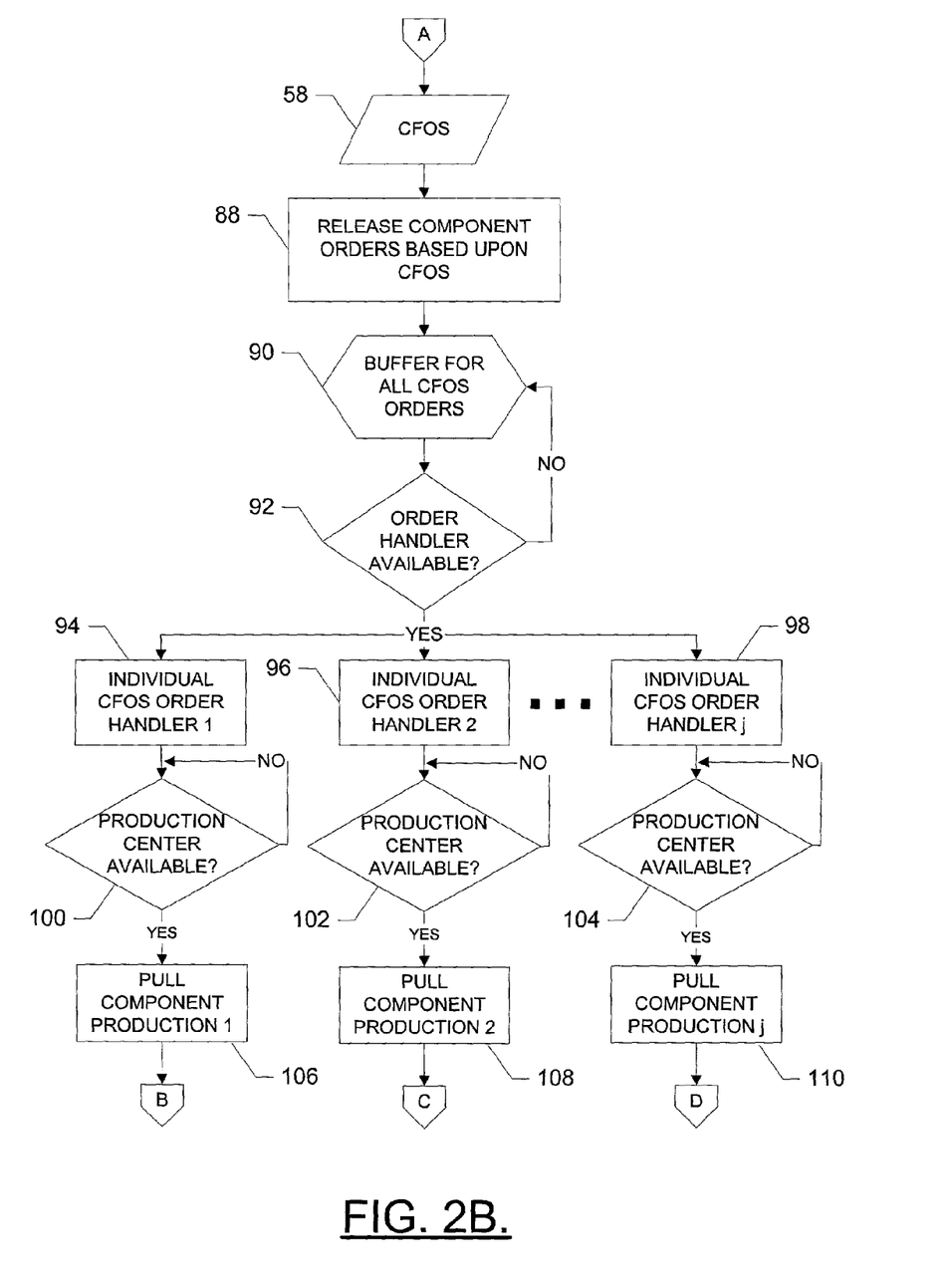

Like the number of assembly lines 28, 30, 32, the number of production centers 46, 48, 50 for producing the components can be set or otherwise defined in any one of a number of different manners. For example, the number of production centers can be set based upon the order distribution of the models corresponding to the respective components. Also, for example, the number of production centers can be set such that a single production center is allocated for each component. In this regard, continuing the example above with a product having four models with each comprising three components, twelve production centers could be specified for the system 10. Referring to FIGS. 2A and 2B, after defining the product manufactured and the number of assembly lines 28, 30, 32 for the ATO portion 12 of the system 10 and the number of production centers 46, 48, 50 for the MTO portion 14 of the system, operation of the system can be simulated by first developing a MFOS for the product over a defined period of time, as shown in block 52. The MFOS is generated to reflect a number of products P ordered by customers over the predefined time period. For example, the MFOS could be generated to reflect ten products ordered (P=10) over a one week time period. Because manufacturing does not typically progress every day of the predefined time period, the time period must be further narrowed down to the working time period T that the product is being produced. For example, presume a predefined time period of one week, where the products are being produced twenty-four hours per day over five working days. The working time period, in seconds, would then equal 432,000 seconds (i.e., 5 days/week×24 hours/day×3600 seconds/hour).

Also, because not all models of a product are typically ordered in the same percentages, a distribution of models ordered over the period of time can also be specified. The distribution can be specified according to any one of a number of different methods such as, for example, from historical orders of the product. From the example above, consider that the ten products ordered from four models (M=4) of the product are ordered according to the following distribution: $A_1$=50%, $A_2$= 30%, $A_3$=12% and $A_4$=8%. In addition, additional order parameters, referred to as optional rules, can be specified based upon the product and manufacturing of the product. For example, certain models of the product can be bundled together based upon similarities in producing the models, such as similarities in components and assembling facilities.

After the product and order parameters have been defined and specified, the MFOS can be generated. In generating the MFOS, a sequence of orders are generated and designated $O_p$, where p=1, 2, . . . . Then, because in implemented manufacturing systems orders for models of the product arrive randomly, a model of the product is randomly assigned to each order based upon the model distribution and the optional rules, if any. Finally, a time the system releases the order to be assembled is generated, where the order release time is represented as $S_p$. In generating the order release time, consider that the system releases the first order for the first product (p= 1) to be assembled at time t=0. Also, consider that the system releases the last order for the last product (p=P) to be assembled at time t=T. The order release time for each order $O_p$ can then be generated according to the following:

$$S_p = S_{p-1} + T/(P-1) \qquad (1)$$

After determining the order release times for each product, the MFOS is complete, as shown in block 54. Continuing the example above for 10 orders (P=10), where no optional rules have been specified, the MFOS could look something like as follows:

| Order No. | Model | Release Time |
|---|---|---|
| 1 | $A_1$ | 0 |
| 2 | $A_4$ | 48,000 |
| 3 | $A_1$ | 96,000 |
| 4 | $A_1$ | 144,000 |
| 5 | $A_2$ | 192,000 |
| 6 | $A_1$ | 240,000 |
| 7 | $A_3$ | 288,000 |
| 8 | $A_1$ | 336,000 |
| 9 | $A_2$ | 384,000 |
| 10 | $A_2$ | 432,000 |

As shown, each order for a model of the product comprises an order for a single product. It will be appreciated, however, that in some instances one or more orders can have a quantity of the product ordered greater than one.

As stated before, the assembly time of the product is based upon the time required to manufacture the components of the product. To most efficiently operate the system, then, the manufacturing times of the components of the product ordered must be tied to the assembly time of the final product. Therefore, according to the present invention, after the MFOS has been generated, the CFOS is generated based upon the MFOS for the components of the models of the product ordered, as shown in block 56. In addition to the MFOS, the CFOS is also generated based upon the MFOS and the manufacturing time $CM_{m,j}$ of each component of each model ordered. In this regard, a first step in generating the CFOS is to determine a component order release time for the components to be manufactured according to MTO portion of the system. In generating the CFOS, it will be presumed that all of the components of all the models ordered are manufactured independent of one another (i.e., each production center 46, 48, 50 is dedicated to a particular component $C_{m,j}$) such that the manufacture of each component can begin and end at the same times.

Because all of the components of each model are preferably manufactured such that immediately upon completion, the components are pulled to the ATO portion, the component order release time is determined such that the release time plus the manufacture time for the respective component equals the release time of the respective model. Written in terms of the component order release time the component order release time, $CS_{p,m,j}$, for each component can be determined from the following:

$$CS_{p,m,j} = S_p - CM_{m,j} \qquad (2)$$

Containing the example, then, the component order release times can be organized on a component-by-component basis and written as follows:

| Order No. | Components | Release Time |
|---|---|---|
| 1 | $C_{1,1}$ | −187,200 |
| 2 | $C_{4,1}$ | −362,400 |
| 3 | $C_{1,1}$ | −91,200 |
| 4 | $C_{1,1}$ | −43,200 |
| 5 | $C_{2,1}$ | −74,400 |
| 6 | $C_{1,1}$ | 52,800 |
| 7 | $C_{3,1}$ | −64,800 |
| 8 | $C_{1,1}$ | 148,800 |
| 9 | $C_{2,1}$ | 117,600 |
| 10 | $C_{2,1}$ | 165,600 |
| 1 | $C_{1,2}$ | −374,400 |
| 2 | $C_{4,2}$ | −700,800 |
| 3 | $C_{1,2}$ | −278,400 |
| 4 | $C_{1,2}$ | −230,400 |
| 5 | $C_{2,2}$ | −290,400 |
| 6 | $C_{1,2}$ | −134,400 |
| 7 | $C_{3,2}$ | −295,200 |
| 8 | $C_{1,2}$ | −38,400 |
| 9 | $C_{2,2}$ | −98,400 |
| 10 | $C_{2,2}$ | −50,400 |
| 1 | $C_{1,3}$ | −655,200 |
| 2 | $C_{4,3}$ | −1,255,200 |
| 3 | $C_{1,3}$ | −559,200 |
| 4 | $C_{1,3}$ | −511,200 |
| 5 | $C_{2,3}$ | −740,400 |
| 6 | $C_{1,3}$ | −415,200 |
| 7 | $C_{3,3}$ | −946,800 |
| 8 | $C_{1,3}$ | −319,200 |
| 9 | $C_{2,3}$ | −548,400 |
| 10 | $C_{2,3}$ | −500,400 |

With the component-by-component order release schedules, the CFOS can be generated by reordering the components based upon the release times, from the lowest release time to the highest release time. For example, a CFOS can be generated from the component-by-component release times above, and written as follows:

| Order No. | Components | Release Time |
|---|---|---|
| 2 | $C_{4,3}$ | −1,255,200 |
| 7 | $C_{3,3}$ | −946,800 |
| 5 | $C_{2,3}$ | −740,400 |
| 2 | $C_{4,2}$ | −700,800 |
| 1 | $C_{1,3}$ | −655,200 |
| 3 | $C_{1,3}$ | −559,200 |
| 9 | $C_{2,3}$ | −548,400 |
| 4 | $C_{1,3}$ | −511,200 |
| 10 | $C_{2,3}$ | −500,400 |
| 6 | $C_{1,3}$ | −415,200 |
| 1 | $C_{1,2}$ | −374,400 |

-continued

| Order No. | Components | Release Time |
|---|---|---|
| 2 | $C_{4,1}$ | −362,400 |
| 8 | $C_{1,3}$ | −319,200 |
| 7 | $C_{3,2}$ | −295,200 |
| 5 | $C_{2,2}$ | −290,400 |
| 3 | $C_{1,2}$ | −278,400 |
| 4 | $C_{1,2}$ | −230,400 |
| 1 | $C_{1,1}$ | −187,200 |
| 6 | $C_{1,2}$ | −134,400 |
| 9 | $C_{2,2}$ | −98,400 |
| 3 | $C_{1,1}$ | −91,200 |
| 5 | $C_{2,1}$ | −74,400 |
| 7 | $C_{3,1}$ | −64,800 |
| 10 | $C_{2,2}$ | −50,400 |
| 4 | $C_{1,1}$ | −43,200 |
| 8 | $C_{1,2}$ | −38,400 |
| 6 | $C_{1,1}$ | 52,800 |
| 9 | $C_{2,1}$ | 117,600 |
| 8 | $C_{1,1}$ | 148,800 |
| 10 | $C_{2,1}$ | 165,600 |

It will be appreciated that, as one or more components can have different manufacturing times (i.e. $CM_{m,j}$), the ordering sequence of components of the models of the MFOS varies from component to component for every model. Looking at the above example, as component $C_{4,1}$ takes longer to manufacture than component $C_{1,1}$, the sequence of the CFOS differs from the sequence of the MFOS. In this regard, the sequences of components ordered for models of different orders in the MFOS can differ from the sequences of components in the CFOS because the CFOS must release component $C_{4,1}$ before component $C_{1,1}$ in order to have the respective components manufactured at the desired times.

As shown in the above example, some adjacent components have release times that are equal. In such an instance, the order between the two components is irrelevant as all components are manufactured independent of the manufacturing of any other component and both components can be released at the same time. As also shown, some of the components have a negative release times. Thus, to make the CFOS easier to comprehend, the CFOS can, but need not, be normalized to the lowest component release time such that the release time of the component that has the highest manufacture time is zero. The normalized CFOS from above, then, could be represented as follows:

| Order No. | Components | Release Time |
|---|---|---|
| 2 | $C_{4,3}$ | 0 |
| 7 | $C_{3,3}$ | 308,400 |
| 5 | $C_{2,3}$ | 514,800 |
| 2 | $C_{4,2}$ | 554,400 |
| 1 | $C_{1,3}$ | 600,000 |
| 3 | $C_{1,3}$ | 696,000 |
| 9 | $C_{2,3}$ | 706,800 |
| 4 | $C_{1,3}$ | 744,000 |
| 10 | $C_{2,3}$ | 754,800 |
| 6 | $C_{1,3}$ | 840,000 |
| 1 | $C_{1,2}$ | 880,800 |
| 2 | $C_{4,1}$ | 892,800 |
| 8 | $C_{1,3}$ | 936,000 |
| 7 | $C_{3,2}$ | 960,000 |
| 5 | $C_{2,2}$ | 964,800 |
| 3 | $C_{1,2}$ | 976,800 |
| 4 | $C_{1,2}$ | 1,024,800 |
| 1 | $C_{1,1}$ | 1,068,000 |
| 6 | $C_{1,2}$ | 1,120,800 |
| 9 | $C_{2,2}$ | 1,156,800 |

-continued

| Order No. | Components | Release Time |
|---|---|---|
| 3 | $C_{1,1}$ | 1,164,000 |
| 5 | $C_{2,1}$ | 1,180,800 |
| 7 | $C_{3,1}$ | 1,190,400 |
| 10 | $C_{2,2}$ | 1,204,800 |
| 4 | $C_{1,1}$ | 1,212,000 |
| 8 | $C_{1,2}$ | 1,216,800 |
| 6 | $C_{1,1}$ | 1,308,000 |
| 9 | $C_{2,1}$ | 1,372,800 |
| 8 | $C_{1,1}$ | 1,404,000 |
| 10 | $C_{2,1}$ | 1,420,800 |

It will be appreciated that the component order release, as described thus far, are absolute times determined independent of the release times of any other component such that the component order release times for all of the components are based from the same starting time t=0. In this regard, the component release times of the normalized CFOS can be rewritten in relative times to thus complete the CFOS, as shown in block 58 of FIG. 2B. In this regard, the relative component order release time for the first component in the normalized CFOS remains the same as the absolute component order release time. The relative component order release time for each subsequent component, however, is determined as the absolute time for the respective component minus the absolute time for the immediately preceding component on the normalized CFOS. Based upon the example normalized CFOS above, the CFOS including relative component order release times can be written as follows:

| Order No. | Components | Release Time |
|---|---|---|
| 2 | $C_{4,3}$ | 0 |
| 7 | $C_{3,3}$ | 308,400 |
| 5 | $C_{2,3}$ | 206,400 |
| 2 | $C_{4,2}$ | 39,600 |
| 1 | $C_{1,3}$ | 45,600 |
| 3 | $C_{1,3}$ | 96,000 |
| 9 | $C_{2,3}$ | 10,800 |
| 4 | $C_{1,3}$ | 37,200 |
| 10 | $C_{2,3}$ | 10,800 |
| 6 | $C_{1,3}$ | 85,200 |
| 1 | $C_{1,2}$ | 40,800 |
| 2 | $C_{4,1}$ | 12,000 |
| 8 | $C_{1,3}$ | 43,200 |
| 7 | $C_{3,2}$ | 24,000 |
| 5 | $C_{2,2}$ | 4,800 |
| 3 | $C_{1,2}$ | 12,000 |
| 4 | $C_{1,2}$ | 48,000 |
| 1 | $C_{1,1}$ | 43,200 |
| 6 | $C_{1,2}$ | 52,800 |
| 9 | $C_{2,2}$ | 36,000 |
| 3 | $C_{1,1}$ | 7,200 |
| 5 | $C_{2,1}$ | 16,800 |
| 7 | $C_{3,1}$ | 9,600 |
| 10 | $C_{2,2}$ | 14,400 |
| 4 | $C_{1,1}$ | 7,200 |
| 8 | $C_{1,2}$ | 4,800 |
| 6 | $C_{1,1}$ | 91,200 |
| 9 | $C_{2,1}$ | 64,800 |
| 8 | $C_{1,1}$ | 31,200 |
| 10 | $C_{2,1}$ | 16,800 |

As illustrated in the above table, component $C_{1,3}$ for the first order, which is released after 600,000 seconds (i.e., absolute time t=600,000), requires a manufacturing time $CM_{1,3}$=655,200. Thus, the MTO portion 14 of the system 10 is designed to have component $C_{1,3}$ passed to the holding location 51 at time t= 1,255,200 seconds for pulling into the ATO portion 12 of the system. Similarly, it can be shown that the MTO portion is also designed to complete production of the other components for the first order, $C_{1,1}$ and $C_{1,2}$ at the same time as component $C_{1,3}$. In this regard, as no order can be pushed to assembly until all of the components for the respective order have been pulled into the ATO portion of the system, the order will remain buffered in the respective order handler 22, 24, 26 until the MTO portion of the system produces all of the respective components. In the above example, then, as the MFOS has a release time for the first order of t=0, the first order as scheduled in the MFOS will remain buffered in the respective order handler for 1,255,200 seconds.

To synchronize the MFOS and the CFOS such that the first order and, thus, subsequent orders are scheduled for release at the moment the MTO portion 14 of the system 10 completes production of all of the components for the respective orders, the MFOS can be further normalized based upon the scheduled completion time of the components of the model of the first order in the MFOS. Thus, for example, the MFOS can be normalized such that the first order, and each subsequent order, are delayed 1,255,200 seconds before release. Rewriting the exemplar MFOS above, then, to include such a normalization and showing the order release times in relative time (as described above in conjunction with the CFOS), the MFOS could be written as follows:

| Order No. | Model | Release Time |
| --- | --- | --- |
| 1 | $A_1$ | 1,255,200 |
| 2 | $A_4$ | 48,000 |
| 3 | $A_1$ | 48,000 |
| 4 | $A_1$ | 48,000 |
| 5 | $A_2$ | 48,000 |
| 6 | $A_1$ | 48,000 |
| 7 | $A_3$ | 48,000 |
| 8 | $A_1$ | 48,000 |
| 9 | $A_2$ | 48,000 |
| 10 | $A_2$ | 48,000 |

It will be appreciated that typically the smaller the normalizing time factor (i.e., completion time for all of the components of the first order), the more efficient the system 10. It will also be appreciated that, by delaying the release of the orders until the components for the orders have been manufactured, the number of product orders buffered in the ATO portion 12 of the system and the amount of time the product orders are buffered, decreases. Thus, the efficiency of the system is increased. Practically speaking, delaying the release of the orders also provides more time for orders in the MFOS to be modified, such as by customers placing the orders, prior to the orders being released to assembly.

After generating the MFOS and the CFOS, the ATO portion of the system (illustrated primarily in FIG. 2A) and the MTO portion of the system (illustrated primarily in FIG. 2B) can operate based upon the MFOS and CFOS, respectively. As shown in FIG. 2A, then, operation of the ATO portion of the system proceeds with the product orders being released based upon the MFOS, as illustrated in block 58. Each order passes to a buffer (shown in block 60) and a determination is made whether an order handler 22, 24, 26 adapted to process orders for the model ordered is available to accept the order, as shown in block 62. If such an order handler is not available, such as for any one of the reasons described above, the order remains in the buffer until such an order handler becomes available.

If or when an order handler 22, 24, 26 adapted to process the respective order is or becomes available, the order is distributed to the order handler, shown in blocks 64, 66 and 68. While in the order handler, the order handler determines whether an assembly line 28, 30, 32 is available to accept the order, as shown in blocks 70, 72 and 74. If an assembly line is not available to accept the order, the order remains buffered at the order handler until the assembly line can accept the order. Either as the order handler waits for the assembly line to become available or after the assembly line becomes available, the order handler pulls the components for the model of the product ordered from the MTO portion 14 of the system 10. In this regard, the order handler repeatedly checks to see if all of the respective components have been pulled, as shown in blocks 76, 78 and 80.

After an assembly line 28, 30, 32 has become available and all of the respective components have been pulled, the order handler 22, 24, 26 pushes the order to the assembly line for final assembly, as shown in blocks 82, 84 and 86. The order then remains at the assembly line for the duration of assembly of the model ordered, such as for the assembly time previously specified for the model ordered. It will be appreciated that as the order handler does not push the order to the assembly line until all of the components have been pulled from the MTO portion 14 of the system 10, the time between when an order for a product is released and when the final product is assembled is partially based upon the MTO portion of the system. Further, it will also be appreciated that the time required for the order handler to pull all of the components is at least partially based upon the time required to produce the components in the MTO portion of the system. Thus, operation of the MTO portion of the system will now be described.

Referring to FIG. 2B, operation of the MTO portion 14 of the system 10 proceeds with the component orders being released based upon the CFOS, as illustrated in block 88. Like in the ATO portion of the system, each component order then passes to a buffer (shown in block 90) and a determination is made whether an order handler 40, 42, 44 adapted to process orders for the respective component is available to accept the order, as shown in block 92. Also like the MTO portion of the system, if such an order handler is not available, the order remains in the buffer until such an order handler becomes available.

If, or when, an order handler 40, 42, 44 adapted to process the respective component order becomes available, the component order is distributed to the order handler, shown in blocks 94, 96 and 98. While in the order handler, the order handler determines whether a production center is available to accept the order, as shown in blocks 100, 102 and 104. If a production center is not available, then the order remains buffered at the order handler until the assembly line can accept the order. After the production center has become available, the order handler pushes the component order to the production center for production, as shown in blocks 106, 108 and 110. In this regard, the component order remains at the production center for the duration of producing the component, such as for the manufacturing time $CM_{m,j}$ for the component previously defined. And after the production center has produced the component, the component passes to a holding location 51 where the component remains until pulled into the ATO portion of the system by a respective order handler 22, 24, 26.

In modeling the system 10, whereas the availability of assembly lines 28, 30, 32 and/or production centers 46, 48,

50 due to any one of a number of different factors can be taken into account, the availability of such elements is generally determined based upon the release of orders for models of the product and orders for the components of the models, the time required to manufacture the components of the models ordered, and the amount of time required to assemble the components into the models ordered. It will be appreciated, then, that in addition to basing the availability upon the foregoing, other time delays between releasing an order and completing assembly of the product ordered can be considered, whether a regular time delay, such as delays in pulling components from the holding locations 51, or an intermittent time delay, such as those caused by the inoperability of assembly lines and/or production centers.

In modeling the system 10, the efficiency of the system is generally based upon an amount of time orders for models of the product and/or components of the models are buffered, or a number of models and/or components that are buffered, such as in the assembly planner 20 and/or the production planner 38. In this regard, the time can be determined according to any one of a number of different measures. For example, the time can be determined according an amount of time one or more specific orders or models are buffered. Also, for example, the time can be determined according to an average amount of time all orders over a defined time period. As to the number of models and/or components buffered, the efficiency of the system can be measured based upon the number of product orders and/or component orders buffered in any one of a number of different manners. For example, the efficiency of the system can be measured based upon the number of product orders and/or component orders buffered at any one time, a maximum number of product orders and/or component orders buffered, and/or an average number of product orders and/or component orders buffered.

It will be appreciated that if the efficiency of the system 10 is based upon the time product orders and/or component orders are buffered, complete system efficiency is found when the amount of time product orders and/or component orders are buffered is zero such that upon release of product orders and/or component orders, the respective orders immediately proceed through each respective system element to final assembly. It will also be appreciated that if the efficiency of the system is based upon the number of product orders and/or component orders buffered, complete system efficiency is found when no more than one product order or component order is buffered at any one time. In this regard, a completely efficient system would operate such that just as a subsequent product order and/or component order reaches a respective buffer (shown in blocks 60, 90), a prior product order or component order in the respective buffer passes out of the buffer.

In measuring the efficiency of the system 10 against a completely efficient system, inefficiencies in the amount of time product orders and/or component orders are buffered or the number of product orders and/or component orders buffered can be compared against a threshold amount of time or number of orders. If the amount of time or number of orders is greater than the threshold then, the efficiency of the system can typically be increased to bring the time or number of orders below the threshold to achieve a desired level of efficiency. For example, according to the example used herein of a product having four models of three components each, threshold numbers of component orders buffered and time buffered can be established at 15 and 144 hours, respectively. Similarly, threshold numbers of product orders buffered and time buffered can be established at 4 and 48 hours, respectively.

To increase the efficiency, parameters of the system 10 can be adjusted based upon the nature of the efficiency. For example, presume an inefficiency in the system is determined based upon an increased number of orders for a specific model of the product buffered at any time. In such an instance, the efficiency can typically be increased by increasing the number of assembly lines adapted to assemble the specific model or decreasing the assembly time of the specific model. Likewise, if an inefficiency in the system is determined based upon an increased number of orders for a specific component of the product buffered at any time, the efficiency can typically be increased by increasing the number of production centers adapted to produce the specific component or decreasing the amount of manufacturing time of the specific component.

Further, presume an inefficiency in the system is determined based upon an increased amount of time an order for a specific component is buffered. In such an instance, the efficiency of the system can typically be increased by decreasing the manufacturing time of the respective component or increasing the number of production centers adapted to produce the respective component. Also, presume an inefficiency in the system is determined based upon an increased amount of time an order for a specific product is buffered. In such an instance, the efficiency can typically be increased by decreasing the assembly time of the respective product, increasing the number of assembly lines or by increasing the efficiency of manufacturing the components, as just described.

All or any portion of the method of modeling the manufacturing of a product according to various embodiments of the present invention is generally implemented by one or more computer processing elements, such as microprocessors or the like. The computer processing elements typically operate under the control of a computer program product. The computer program product includes a computer-readable storage medium, such as a non-volatile storage medium, and computer-readable program code portions, such as a series of computer instructions, embodied in the computer-readable storage medium. Typically, the computer program product is stored by the computer processing element or a related memory device.

In this regard, FIGS. 1, 2A and 2B are block diagrams and control flow illustrations of methods, systems and program products according to the invention. It will be understood that each block or step of the block diagram, flowchart and control flow illustrations, and combinations of blocks in the block diagram, flowchart and control flow illustrations, can be implemented by computer program instructions. These computer program instructions may be loaded onto a computer or other programmable apparatus to produce a machine, such that the instructions which execute on the computer or other programmable apparatus create means for implementing the functions specified in the block diagram, flowchart or control flow block(s) or step(s). These computer program instructions may also be stored in a computer-readable memory that can direct a computer or other programmable apparatus to function in a particular manner, such that the instructions stored in the computer-readable memory produce an article of manufacture including instruction means which implement the function specified in the block diagram, flowchart or control flow block(s) or step(s). The computer program instructions may also be loaded onto a computer or other programmable apparatus to cause a series of operational steps to be performed on the computer or other programmable apparatus to produce a computer implemented process such that the instructions which execute on the computer or other programmable apparatus provide steps for implementing the functions specified in the block diagram, flowchart or control flow block(s) or step(s).

Accordingly, blocks or steps of the block diagram or control flow illustrations support combinations of means for performing the specified functions, combinations of steps for performing the specified functions and program instruction means for performing the specified functions. It will also be understood that each block or step of the block diagram, flowchart or control flow illustrations, and combinations of blocks or steps in the block diagram, flowchart or control flow illustrations, can be implemented by special purpose hardware-based computer systems which perform the specified functions or steps, or combinations of special purpose hardware and computer instructions.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method of modeling the manufacturing of a product in a pull and push manufacturing system, where the product comprises at least one model and each model includes at least one component, said method comprising:
   simulating operation of the manufacturing system, wherein simulating comprises:
   generating a master firing order schedule (MFOS) for a plurality of orders for at least one model of the product over a defined time period, wherein the orders are in a predefined sequence and each order includes a defined release time;
   generating a component firing order schedule (CFOS) for a plurality of components corresponding to the models ordered in the MFOS, wherein the components are in a predetermined sequence and each component has a defined release time, the predetermined sequence being set based upon the defined release times of the respective orders and manufacturing times associated with the components such that at least one component for an order is capable of being released after at least one component for a subsequent order;
   releasing each order in the MFOS at a respective release time and releasing each component in the CFOS at a respective release time;
   producing the components at a set number of production centers for the respective set manufacturing times, wherein when a subsequent component is released before all preceding components in the CFOS are produced the subsequent component is buffered until the preceding components are produced; and
   assembling the orders from the produced components at a set number of assembly lines for set assembly times associated with the models ordered, wherein when a subsequent order is released before the models in all preceding orders in the MFOS are assembled the subsequent order is buffered until the models in all preceding orders are assembled; and
   adjusting at least one of the set assembly time for at least one of the models of the product, the set manufacturing time for at least one of the components of the models, the set number of production centers or the set number of assembly lines based upon at least one of a subsequent component or a subsequent order being buffered.

2. A method according to claim 1 further comprising measuring an efficiency of the system based upon at least one of a number of subsequent components buffered or a number of subsequent orders buffered, wherein measuring the efficiency occurs after assembling the orders, and wherein the adjusting step is based upon the measured efficiency.

3. A method according to claim 2, wherein measuring an efficiency comprises comparing the number of subsequent components buffered to a threshold such that when the number of subsequent components buffered is greater than the threshold the adjusting step comprises at least one of increasing the number of production centers or decreasing the manufacturing times of the respective components.

4. A method according to claim 2, wherein measuring an efficiency comprises comparing the number of subsequent orders buffered to a threshold such that when the number of subsequent orders buffered is greater than a threshold the adjusting step comprises at least one of increasing the number of assembly lines or decreasing the assembly times of the respective models ordered.

5. A method according to claim 1 further comprising measuring an efficiency of the system based upon at least one of an amount of time subsequent components are buffered or an amount of time subsequent orders are buffered, wherein measuring an efficiency occurs after assembling the orders, and wherein the adjusting step is based upon the measured efficiency.

6. A method according to claim 5, wherein measuring an efficiency comprises comparing an amount of time subsequent components are buffered to a threshold such that when subsequent components are buffered for longer than the threshold the adjusting step comprises at least one of increasing the number of production centers or decreasing the manufacturing times of the respective components.

7. A method according to claim 6, wherein measuring an efficiency comprises comparing an amount of time subsequent orders are buffered to a threshold such that when subsequent orders are buffered for longer than the threshold the adjusting step comprises at least one of increasing the number of assembly lines, decreasing the assembly times of the respective models ordered, increasing the number of production centers or decreasing the manufacturing times of the respective components.

8. A method of manufacturing a product in a pull and push manufacturing system, where the product comprises at least one model and each model includes at least one component, said method comprising:
   receiving a plurality of orders for at least one model of the product, wherein each model has an associated assembly time, and wherein the orders are in a predefined sequence and each order includes a defined release time;
   generating a component firing order schedule (CFOS) for a plurality of components corresponding to the models ordered, wherein the components are in a predetermined sequence and each component has a defined release time, the predetermined sequence being set based upon the defined release times of the respective orders and manufacturing times associated with the components such that at least one component for an order is capable of being released after at least one component for a subsequent order;

releasing each order at a respective release time and releasing each component in the CFOS at a respective release time;

producing the components released at a number of production centers and thereafter assembling the orders released from the produced components at a number of assembly lines, wherein at least one of the assembly times of the models ordered, the manufacturing times of the components of the models ordered, the number of production centers or the number of assembly lines are set;

determining when at least one of a subsequent component or a subsequent order is buffered, wherein determining when a subsequent component is buffered comprises determining when a subsequent component is released before all preceding components in the CFOS are produced, and wherein determining when a subsequent order is buffered comprises determining when a subsequent order is released before the models in all preceding orders received are assembled; and adjusting at least one of the set assembly time for at least one of the models of the product, the set manufacturing time for at least one of the components of the models, the set number of production centers or the set number of assembly lines based upon at least one of a subsequent component or a subsequent order being buffered.

9. A method according to claim 8 further comprising modeling the system before generating the CFOS, wherein modeling the system comprises:

simulating operation of the system with a set assembly time for each of the models of the product, a set manufacturing time for each of the components of the models, a set number of production centers and a set number of assembly lines, wherein simulating operation of the system occurs for a number of models of the product ordered over a defined time period;

determining when at least one of a subsequent component or a subsequent order is buffered; and adjusting at least one of the set assembly time for at least one of the models of the product, the set manufacturing time for at least one of the components of the models, the set number of production centers or the set number of assembly lines based upon at least one of a subsequent component or a subsequent order being buffered.

10. A method according to claim 9, wherein modeling the system further includes measuring an efficiency of the system based upon at least one of a number of subsequent components buffered or a number of subsequent orders buffered, wherein measuring the efficiency occurs before the adjusting step, and wherein the adjusting step is based upon the measured efficiency.

11. A method according to claim 10, wherein modeling the system further comprises setting the number of production centers and the manufacturing time associated with each component before simulating operation of the system, wherein measuring an efficiency comprises comparing the number of subsequent orders buffered to a threshold such that when the number of subsequent components buffered is greater than the threshold the adjusting step comprises at least one of increasing the number of production centers or decreasing the manufacturing times of the respective components.

12. A method according to claim 10, wherein modeling the system further comprises setting the number of assembly lines and the assembly time associated with each model of the product, wherein measuring an efficiency comprises comparing the number of subsequent orders buffered to a threshold such that when the number of subsequent orders buffered is greater than the threshold the adjusting step comprises at least one of increasing the number of assembly lines or decreasing the assembly times of the respective models ordered.

13. A method according to claim 9 wherein modeling the system further includes measuring an efficiency of the system based upon at least one of an amount of time subsequent components are buffered or an amount of time subsequent orders are buffered, wherein measuring the efficiency occurs before the adjusting step, and wherein the adjusting step is based upon the measured efficiency.

14. A method according to claim 13, wherein modeling the system further comprises setting the number of production centers and the manufacturing time associated with each component before simulating operation of the system, wherein measuring an efficiency comprises comparing an amount of time subsequent orders are buffered to a threshold such that when subsequent components are buffered for longer than the threshold the adjusting step comprises at least one of increasing the number of production centers or decreasing the manufacturing times of the respective components.

15. A method according to claim 14, wherein modeling the system further comprises setting the number of assembly lines and the assembly time associated with each model of the product, wherein measuring an efficiency comprises comparing an amount of time subsequent orders are buffered to a threshold such that when subsequent orders are buffered for longer than the threshold the adjusting step comprises at least one of increasing the number of assembly lines, decreasing the assembly times of the respective models ordered, increasing the number of production centers or decreasing the manufacturing times of the respective components.

16. A system of manufacturing a product in a pull and push manufacturing system, where the product comprises at least one model and each model includes at least one component, said system comprising:

an order scheduler capable of receiving a plurality of orders for at least one model of the product, wherein each model has an associated assembly time, and wherein the orders are in a predefined sequence and each order includes a defined release time;

a component scheduler capable of generating a component firing order schedule (CFOS) for a plurality of components corresponding to the models ordered, wherein the components are in a predetermined sequence and each component has a defined release time, the predetermined sequence being set based upon the defined release times of the respective orders and manufacturing times associated with the components such that at least one component for an order is capable of being released after at least one component for a subsequent order;

a make-to-order (MTO) portion capable of releasing each component in the CFOS at a respective release time and thereafter producing the components released at a number of production centers;

an assemble-to-order (ATO) portion capable of releasing each order at a respective release time and thereafter assembling the orders released from the produced components at a number of assembly lines,
wherein at least one of the assembly times of the models ordered, the manufacturing times of the components of the models ordered, the number of production centers or the number of assembly lines are set; and
a processing element capable of determining when at least one of a subsequent component or a subsequent order is buffered, wherein said processing element is capable of adjusting at least one of the set assembly time for at least one of the models of the product, the set manufacturing time for at least one of the components of the models, the set number of production centers or the set number of assembly lines based upon at least one of a subsequent component or a subsequent order being buffered.

17. A system according to claim 16, wherein said processing element is capable of modeling the system before said component scheduler generates the CFOS, wherein said processing element is capable of modeling the system by simulating operation of the system with a set assembly time for each of the models of the product, a set manufacturing time for each of the components of the models, a set number of production centers and a set number of assembly lines, and wherein said processing element is capable of simulating operation of the system for a number of models of the product ordered over a defined time period.

18. A system according to claim 17, wherein said processing element is also capable of measuring an efficiency of the system based upon at least one of a number of subsequent components buffered or a number of subsequent orders buffered, and wherein said processing element is capable of adjusting at least one of the set assembly time for at least one of the models of the product, the set manufacturing time for at least one of the components of the models, the set number of production centers or the set number of assembly lines based upon the measured efficiency.

19. A system according to claim 18, wherein said processing element is capable of further modeling the system by setting the number of production centers and the manufacturing time associated with each component before simulating operation of the system, wherein said processing element is capable of measuring an efficiency by comparing the number of subsequent orders buffered to a threshold such that when the number of subsequent components buffered is greater than the threshold said processing element can at least one of increase the number of production centers or decrease the manufacturing times of the respective components.

20. A system according to claim 18, wherein said processing element is capable of further modeling the system by setting the number of assembly lines and the assembly time associated with each model of the product, wherein said processing element is capable of measuring an efficiency by comparing the number of subsequent orders buffered to a threshold such that when the number of subsequent orders buffered is greater than the threshold said processing element can at least one of increase the number of assembly lines or decrease the assembly times of the respective models ordered.

21. A system according to claim 17 wherein said processing element is capable of further modeling the system by measuring an efficiency of the system based upon at least one of an amount of time subsequent components are buffered or an amount of time subsequent orders are buffered, and wherein said processing element is capable of adjusting at least one of the set assembly time for at least one of the models of the product, the set manufacturing time for at least one of the components of the models, the set number of production centers or the set number of assembly lines based upon the measured efficiency.

22. A system according to claim 21, wherein said processing element is capable of further modeling the system by setting the number of production centers and the manufacturing time associated with each component before simulating operation of the system, wherein said processing element is capable of measuring an efficiency by comparing an amount of time subsequent orders are buffered to a threshold such that when subsequent components are buffered for longer than the threshold said processing element can at least one of increase the number of production centers or decrease the manufacturing times of the respective components.

23. A system according to claim 22, wherein said processing element is capable of further modeling the system by setting the number of assembly lines and the assembly time associated with each model of the product, wherein said processing element is capable of measuring an efficiency by comparing an amount of time subsequent orders are buffered to a threshold such that when subsequent orders are buffered for longer than the threshold said processing element can at least one of increase the number of assembly lines, decrease the assembly times of the respective models ordered, increase the number of production centers or decrease the manufacturing times of the respective components.

24. A computer program product for modeling the manufacturing of a product in a pull and push manufacturing system, where the product comprises at least one model and each model includes at least one component, said computer program product comprising a computer-readable storage medium having computer-readable program code portions stored therein, the computer-readable program portions comprising:
a first executable portion for simulating operation of the manufacturing system, wherein said first executable portion simulates the operation by:
generating a master firing order schedule (MFOS) for a plurality of orders for models of the product over a defined time period, wherein the orders are in a predefined sequence and each order includes a defined release time;
generating a component firing order schedule (CFOS) for a plurality of components corresponding to the models ordered in the MFOS, wherein the components are in a predetermined sequence and each component has a defined release time, the predetermined sequence being set based upon the defined release times of the respective orders and manufacturing times associated with the components such that at least one component for an order is capable of being released after at least one component for a subsequent order;
releasing each order in the MFOS at a respective release time and releasing each component in the CFOS at a respective release time;
producing the components at a set number of production centers for the respective set manufacturing times, wherein when a subsequent component is released before all preceding components in the CFOS are produced the subsequent component is buffered until the preceding components are produced; and
assembling the orders from the produced components at a set number of assembly lines for set assembly times associated with the models ordered, wherein when a subsequent order is released before the models in all preceding orders in the MFOS are assembled the subsequent order is buffered until the models in all preceding orders are assembled; and a second executable portion for adjusting at least one of the set assembly time for at least one of the models of the product, the set manufacturing time for at least one of the components of the models, the set number of production centers or the set number of assembly lines based upon at least one of a subsequent component or a subsequent order being buffered.

25. A computer program product according to claim 24 further comprising a third executable portion for measuring an efficiency of the system based upon at least one of a number of subsequent components buffered or a number of subsequent orders buffered, wherein said third executable portion measures the efficiency after said first executable portion assembles the orders, and wherein said second executable portion adjusts at least one of the set assembly time for at least one of the models of the product, the set manufacturing time for at least one of the components of the models, the set number of production centers or the set number of assembly lines based upon the measured efficiency.

26. A computer program product according to claim 25, wherein said third executable portion measures the efficiency by comparing the number of subsequent components buffered to a threshold such that when the number of subsequent components buffered is greater than the threshold said second executable portion can at least one of increase the number of production centers or decrease the manufacturing times of the respective components.

27. A computer program product according to claim 25, wherein said third executable portion measures the efficiency by comparing the number of subsequent orders buffered to a threshold such that when the number of subsequent orders buffered is greater than a threshold said second executable portion can at least one of increase the number of assembly lines or decrease the assembly times of the respective models ordered.

28. A computer program product according to claim 24 further comprising a third executable portion capable of measuring an efficiency of the system based upon at least one of an amount of time subsequent components are buffered or an amount of time subsequent orders are buffered, wherein said third executable portion measures the efficiency occurs after said first executable portion assembles the orders, and wherein the adjusting step is based upon the measured efficiency.

29. A computer program product according to claim 28, wherein measuring an efficiency comprises comparing an amount of time subsequent components are buffered to a threshold such that when subsequent components are buffered for longer than the threshold said second executable portion can at least one of increase the number of production centers or decrease the manufacturing times of the respective components.

30. A computer program product according to claim 29, wherein said third executable portion can measure the efficiency by comparing an amount of time subsequent orders are buffered to a threshold such that when subsequent orders are buffered for longer than the threshold said second executable portion can at least one of increase the number of assembly lines, decrease the assembly times of the respective models ordered, increase the number of production centers or decrease the manufacturing times of the respective components.

* * * * *